US012780299B2

(12) United States Patent
Xu

(10) Patent No.: US 12,780,299 B2
(45) Date of Patent: Nov. 3, 2026

(54) DYNAMIC VIRTUAL C-FACTOR CONTROL FOR STEER-BY-WIRE SYSTEM

(71) Applicant: Steering Solutions IP Holding Corporation, Saginaw, MI (US)

(72) Inventor: Kaiser Xu, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 40 days.

(21) Appl. No.: 18/947,446

(22) Filed: Nov. 14, 2024

(65) Prior Publication Data

US 2026/0125104 A1 May 7, 2026

(30) Foreign Application Priority Data

Nov. 7, 2024 (CN) ........................ 202411585408.X

(51) Int. Cl.
*B62D 6/00* (2006.01)
*B62D 5/00* (2006.01)

(52) U.S. Cl.
CPC ............... *B62D 6/00* (2013.01); *B62D 5/001* (2013.01)

(58) Field of Classification Search
CPC .................................. B62D 6/00; B62D 5/001
See application file for complete search history.

(56) References Cited

U.S. PATENT DOCUMENTS

| | | | | |
|---|---|---|---|---|
| 7,104,615 B2 * | 9/2006 | Kato | | B60T 8/1755 303/146 |
| 7,213,892 B2 * | 5/2007 | Kato | | B60T 8/4872 303/3 |
| 7,246,864 B2 * | 7/2007 | Kato | | B60T 8/1755 701/72 |
| 7,658,454 B2 * | 2/2010 | Kato | | B60T 8/4872 303/146 |
| 11,697,455 B2 * | 7/2023 | Sakaguchi | | B62D 5/091 180/6.5 |
| 2020/0172160 A1 * | 6/2020 | Sakaguchi | | B62D 5/046 |
| 2024/0375706 A1 | 11/2024 | Xu | | |

FOREIGN PATENT DOCUMENTS

| | | | | |
|---|---|---|---|---|
| CN | 115042858 A * | 9/2022 | | B62D 5/046 |
| DE | 102008012007 B4 | 2/2012 | | |
| DE | 102014017127 A1 | 5/2016 | | |
| DE | 102021202343 A1 | 9/2022 | | |
| DE | 102023113044 B3 | 4/2024 | | |

OTHER PUBLICATIONS

English translation of CN-115042858-A.*
German Examination Report and Translation dated Aug. 5, 2025, corresponding to German Application No. 102024135340.6, 8 pages.

* cited by examiner

*Primary Examiner* — Joseph J Dallo
(74) *Attorney, Agent, or Firm* — Dickinson Wright PLLC

(57) ABSTRACT

A method for controlling a steer-by-wire (SbW) steering system of a vehicle includes, using one or more processors, receiving one or more inputs indicating respective operating characteristics of the vehicle, determining a baseline C-factor based on vehicle speed, the baseline C-factor corresponding to a linear distance traversed by a rack of the SbW steering system relative to rotation of a handwheel of the vehicle, determining a scaling factor based on the vehicle speed and vehicle lateral acceleration, determining a scaled C-factor using the baseline C-factor and the scaling factor, determining a rack position reference based on the scaled C-factor, and controlling at least one function of the vehicle using the rack position reference.

20 Claims, 5 Drawing Sheets

DYNAMIC VIRTUAL C-FACTOR CONTROL FOR STEER-BY-WIRE SYSTEM

CROSS-REFERENCE TO RELATED APPLICATIONS

This application claims the benefit of Chinese Application No. 202411585408.X, filed on Nov. 7, 2024. The entire disclosure of the application referenced above is incorporated herein by reference.

TECHNICAL FIELD

This disclosure relates to determination of a C-factor in steer-by-wire (SbW) steering systems.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to control of SbW steering systems.

An aspect of the disclosed embodiments includes a method for controlling a steer-by-wire (SbW) steering system of a vehicle. The method includes, using one or more processors, receiving one or more inputs indicating respective operating characteristics of the vehicle, determining a baseline C-factor based on vehicle speed, the baseline C-factor corresponding to a linear distance traversed by a rack of the SbW steering system relative to rotation of a handwheel of the vehicle, determining a scaling factor based on the vehicle speed and vehicle lateral acceleration, determining a scaled C-factor using the baseline C-factor and the scaling factor, determining a rack position reference based on the scaled C-factor, and controlling at least one function of the vehicle using the rack position reference.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
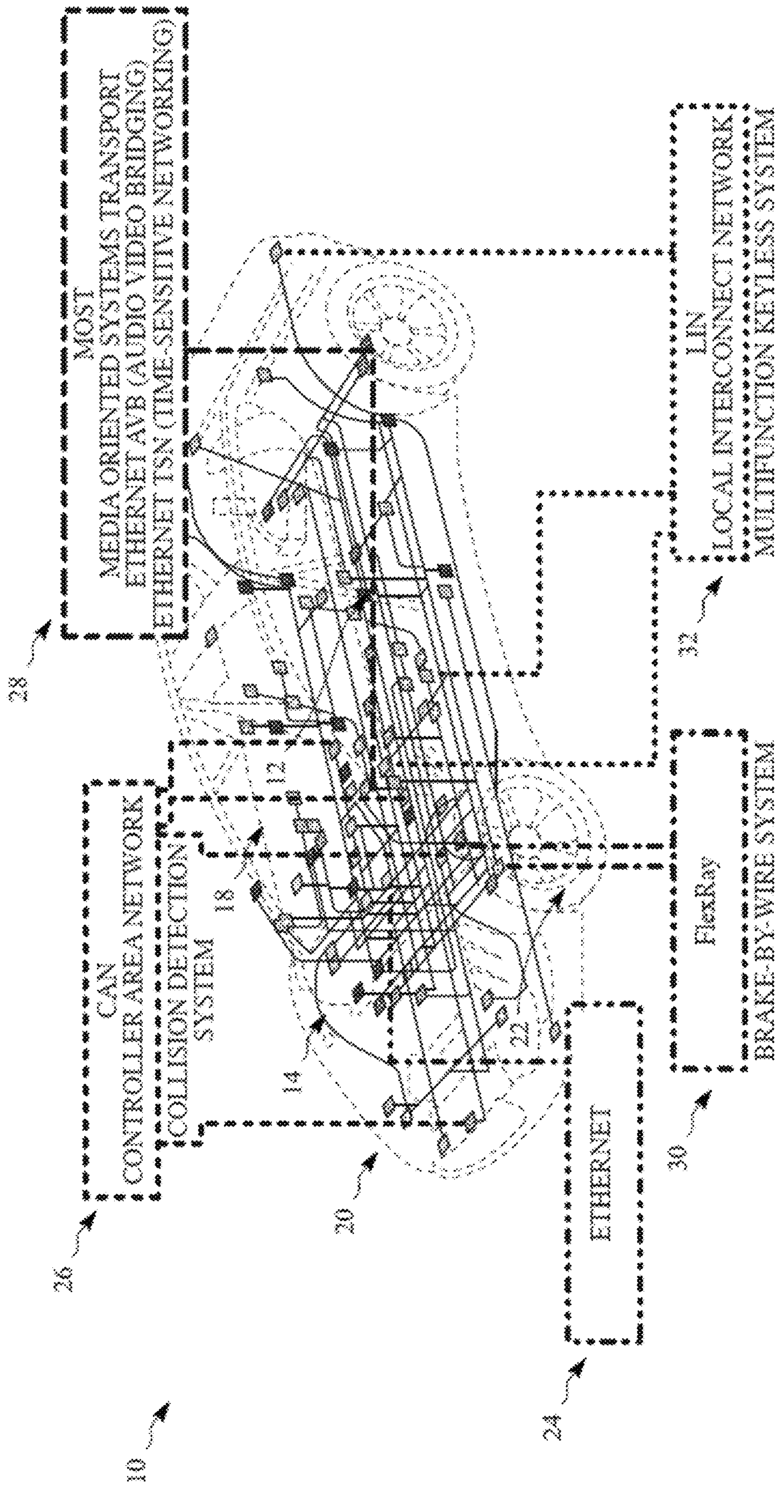
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

A SbW steering system may include at least one handwheel actuator (HWA), such as a steering wheel, which is used by a driver to control the vehicle laterally, and at least one roadwheel actuator (RWA), which is used to control a steered axle of the vehicle and create lateral motion of the vehicle responsive to movement of the HWA. A SbW system may further include a controller, such as a domain controller, configured to store and execute control logic.

SbW systems have some advantages over other types of steering systems, such as EPS steering systems. For example, SbW systems are not limited by a mechanical linkage between the HWA and the RWA. Accordingly, SbW systems may have more efficient packaging, increased crashworthiness and cost savings, and improved interaction with automated driving and advanced driver assistance systems (and corresponding safety and performance benefits).

In SbW systems, a mechanical connection between the handwheel and the roadwheel is removed and a steering ratio between the handwheel and the roadwheel is not fixed. The steering ratio between the handwheel and the road wheel is typically defined by a relationship between a pinion and rack, which may be referred to as a C-factor. The C-factor is defined as a linear distance traversed by the rack for one complete handwheel revolution. The C-factor may be a virtual value that is be tunable based on various factors, including, but not limited to, rack position, vehicle speed, and vehicle lateral states (e.g., lateral acceleration and yaw rate).

As one example (e.g., for passenger vehicles with standard EPS), the handwheel can be steered for more than one (1) turn from a center position to a rack end position and the C-factor is between 50-70 mm/revolution. Conversely, for passenger vehicles with SbW systems, the handwheel may only be steered for less than one half of a turn from the center position to the rack end position and the C-factor may be greater than 150 mm/revolution. Accordingly, vehicles with SbW systems are more responsive than non-SbW systems, increasing a likelihood of reaching a tire adhesion limit. As used herein, tire adhesion limit refers to a maximum lateral force a tire can generate before losing traction with a road surface.

Accordingly, SbW systems and methods according to the present disclosure are configured to implement dynamic C-factor control techniques to minimize the likelihood of reaching the tire adhesion limit. For example, the C-factor is controlled/adjusted using a scaling factor or value that varies based on lateral acceleration (e.g., the C-factor may be scaled downward as lateral acceleration increases to minimize the likelihood of reach the tire adhesion limit). Further, the C-factor may vary for different vehicle speeds or speed ranges, and different scaling may be applied for the different vehicle speeds.

FIG. 1A generally illustrates a vehicle 10 according to the principles of the present disclosure. The vehicle 10 may include any suitable vehicle, such as a car, a truck, a sport utility vehicle, a minivan, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semiautonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media-oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. The steering system of the present disclosure is configured to implement SbW control techniques as described below in more detail.

Figure 1B:
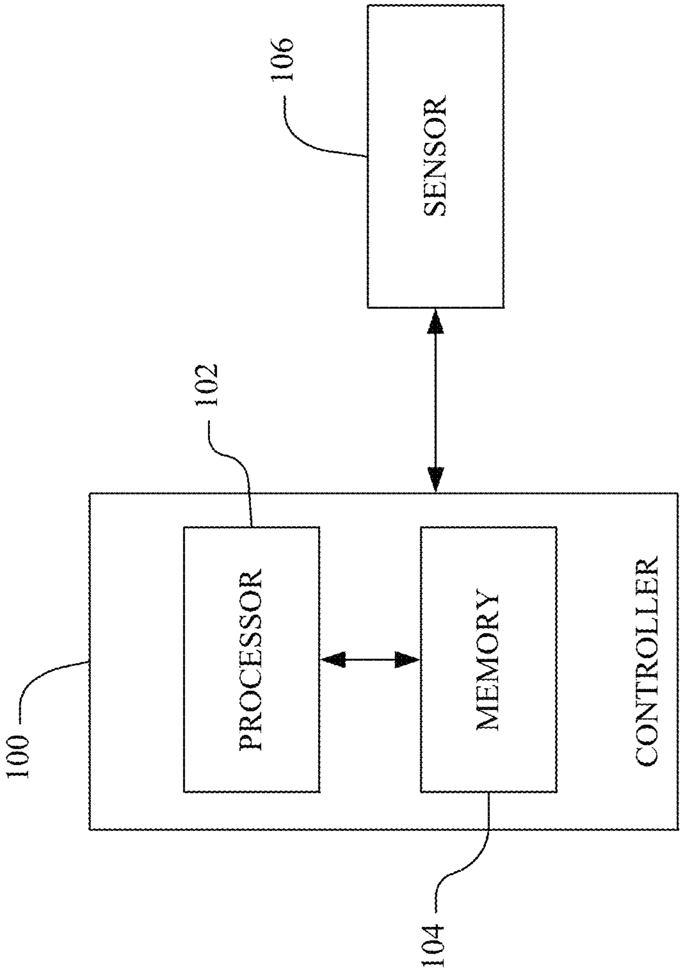
FIG. 1B generally illustrates a controller according to the principles of the present disclosure.

In some embodiments, the vehicle 10 includes one or more controllers, such as controller 100, as is generally illustrated in FIG. 1B. The controller 100 may correspond to a steering system controller. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

As used herein, "controller" may refer to a hardware module or assembly including one or more processors or microcontrollers, memory, sensors, one or more actuators, a communication interface, etc., any portions of which may be collectively referred to as "circuitry." As described herein, respective functions and steps performed by a given controller, control circuitry, etc. may be collectively performed by multiple controllers, processors, etc. For example, a processor, processing device, controller, control circuitry, etc. "configured to perform" may refer to a single processor, processing device, controller, etc. configured to perform both A and B or may refer to a first processor, processing device, controller, etc. configured to perform A and a second processor, processing device, controller, etc. configured to perform B. For simplicity, "control circuitry configured to perform A and B" may refer to a single or multiple processors, processing devices, controllers, etc. collectively configured to perform A and B.

In some embodiments, the controller 100 may perform the methods described herein. However, the methods described herein as performed by the controller 100 are not meant to be limiting, and any type of software executed on a controller, processor, or other circuitry can implement the SbW control techniques described herein without departing from the scope of this disclosure. For example, a controller, such as a processor executing software within a computing device, can implement the systems and methods described herein.

Figure 2A:
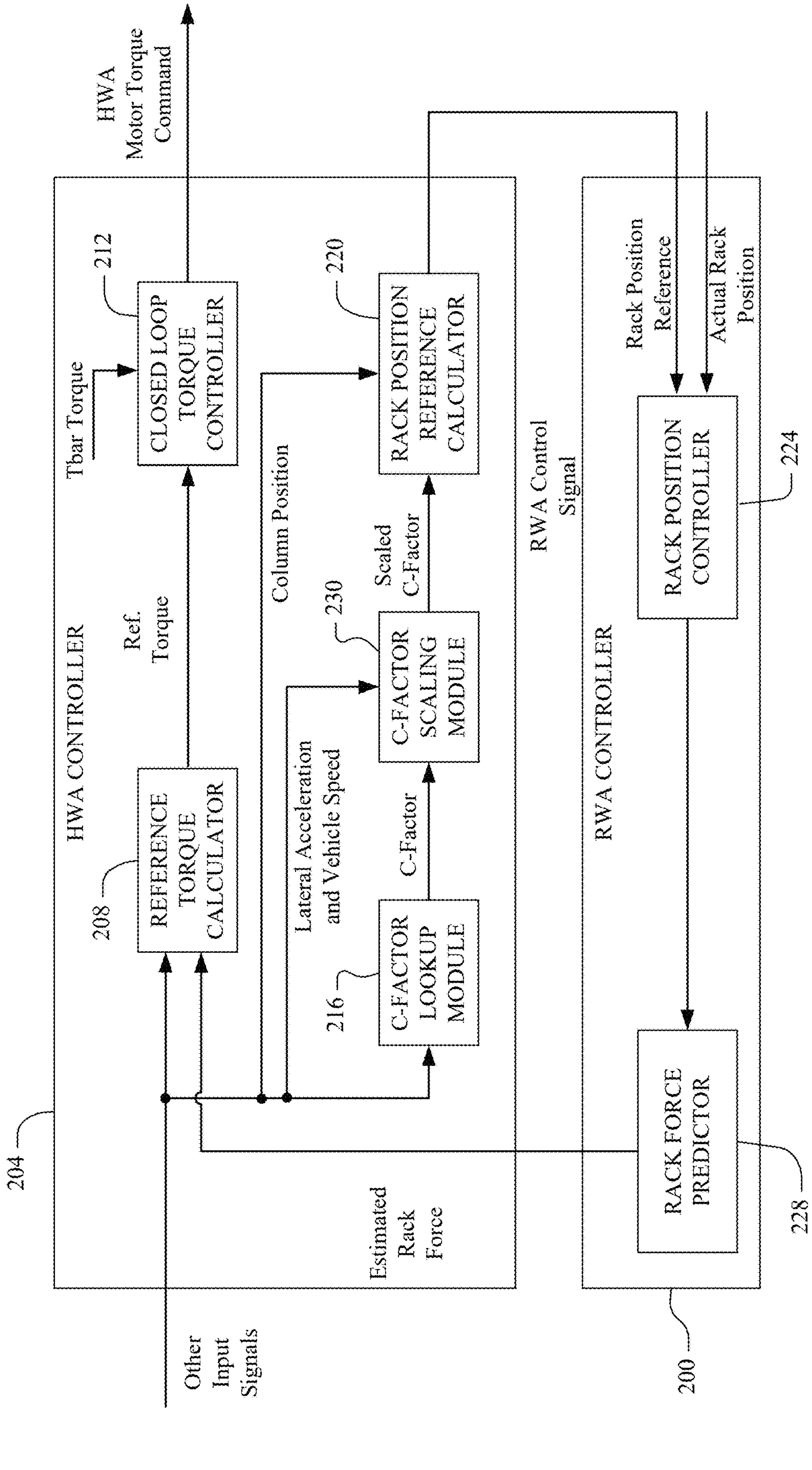
FIG. 2A generally illustrates an example rack or roadwheel actuator (RWA) controller and column or handwheel actuator (HWA) controller of a steering system configured according to the principles of the present disclosure.

FIG. 2A illustrates an example rack or RWA controller 200 and column or handwheel actuator (HWA) controller 204 of a steering system configured to implement SbW (e.g., SbW C-factor) control techniques according to the present disclosure. For example, the HWA controller 204 is configured to generate a handwheel actuator (HWA) motor torque command based on an estimated rack force (e.g., an estimated rack force signal) received from the RWA controller 200 and one or more other input signals (e.g., vehicle speed, handwheel position, and handwheel velocity). The RWA controller 200 is configured to determine the estimated rack force based on the motor torque required to achieve or maintain an actual rack position. The controllers 200 and 204 may correspond to, be implemented by, etc. one or more steering system controllers.

As one example, the HWA controller 204 includes a reference torque calculator 208 configured to calculate a reference torque ($T_{ref}$) based on the estimated rack force and the one or more other input signals. For example, the reference torque corresponds to a sum of various inputs/measurements such as effort, hysteresis, return correction, damping, catch, etc. A closed loop (e.g., a PID closed loop) torque controller 212 is configured to generate and output the motor torque command based at least in part on a force or torque applied by the driver (e.g., "Tbar torque") and the reference torque. The motor torque command is provided as a control signal to control a motor of the handwheel actuator.

The estimated rack force corresponds to the measured or estimated roadwheel actuator motor torque. Accordingly, the estimated rack force (and any estimated rack force offset or error) is a critical factor for determining the force provided by the motor of the handwheel actuator.

In some examples, the HWA controller 204 may further include a C-factor lookup module 216 and a rack position reference calculator 220. For example, the rack position reference calculator 220 is configured to generate the rack position reference based on a column or handwheel position and a C-factor received from the C-factor lookup module 216. In some examples, the C-factor as provided by the C-factor lookup module is a ratio, multiplier value, percentage, etc. that is multiplied by the column position to obtain the rack position reference. The C-factor may be determined based on vehicle inputs including, but not limited to, a handwheel angle ("HwAg") corresponding to driver input (e.g., a handwheel angle indicating driver intent conveyed via the handwheel), a rack position, a vehicle speed, etc. Example systems and methods for obtaining the rack position reference and the C-factor are described in more detail in U.S. patent application Ser. No. 18/318,657, filed on May 16, 2023, the entire contents of which are incorporated herein by reference.

In some examples, the C-Factor obtained and provided by the C-factor lookup module 216 may be obtained based in part on vehicle speed (e.g., using a 2D lookup table). For example, a plurality of C-factors may be associated with respective vehicle speed ranges (e.g., 0-5 kph, 5-20 kph, 20-30 kph, etc.). As one example, C-factors associated with lower vehicle speed ranges may be higher than C-factors associated with higher vehicle speed ranges (e.g., the C-factor obtained by the C-factor lookup module 216 may be inversely proportional to vehicle speed). For example, at lower vehicle speeds, a higher C-factor may be used to reduce handwheel turns required to achieve desired lateral movement, thereby improving driving comfort and agility. Conversely, at higher vehicle speeds, a lower c-factor may be used to improve stability of vehicle lateral dynamics and driving safety.

The RWA controller 200 includes a rack position controller 224 (e.g., a PID rack position controller) configured to generate one or more rack position control signals based on the actual rack position and the rack position reference (e.g., based on a difference between the actual rack position and the rack position reference). For example, the rack position control signals may include, but are not limited to, rack motor velocity and motor torque command (e.g., indicative of an amount of torque applied by the driver) signals. In this manner, rack position is controlled to follow the intent of the driver (as indicated by the rack reference position).

A rack force predictor 228 generates the estimated rack force based on outputs of the rack position controller 224 (e.g., based on a function of the rack motor velocity, the rack motor torque command, etc.). In various examples, the estimated rack force may be calculated based on the amount of torque applied to the handwheel by the driver (as indicated by the rack motor torque command, various sensor signals, etc.). As shown, the rack force predictor 228 may output the estimated rack force and the reference torque calculator 208 (and/or another component of the RWA controller 200, the HWA controller 204, etc.) may obtain an estimated rack load based on the estimated rack force. In other examples, the rack force predictor 228 may output the estimated rack load. In some contexts, the terms "estimated rack force" and "estimated rack load" may be used interchangeably.

For example, for RWA position control, the rack position reference signal ("RackPosRef") may be calculated based on a position error ("PosErr") between an ADAS rack position reference value or signal ("ADASRackPosRef") and an HWA rack position reference value or signal ("HWARackPosRef"). Conversely, HWA position control is based on a position error between the HWA position and the RWA position, such that the handwheel can be controlled to rotate in a manner consistent with rotation of the roadwheel in hands-off conditions.

The reference torque may correspond to a desired, ideal, or target torque to be felt by the driver (i.e., at the handwheel/steering wheel). As described above, the reference torque is calculated based on inputs including, but not limited to, driver input (e.g., an input torque, corresponding to steering handwheel angle), road conditions, damping, hysteresis, etc. A torque at the hand wheel is controlled (e.g., via the HWA) to match the reference torque. For example, outputs of one or more sensors measuring actual torque at the wheel are used to minimize the difference between the reference torque and the actual torque.

An effort function (e.g., an effort function implemented by the reference torque calculator 208) defines a relationship between driver input (e.g., the force or torque applied by the driver to the handwheel, which may be referred to as "effort") and a response (i.e., movement) of the steering system. For example, the effort function may output an effort value based on a lookup table or other function (e.g., by using an estimated rack load as an input). The estimated rack load may be modified prior to being input to the lookup table by adding a calculated return load value to the estimated rack load. The effort function indicates an amount of effort required by the driver to cause a desired response.

The HWA controller 204 according to the present disclosure further includes a C-factor scaling module 230. The C-factor scaling module 230 is configured to adjust/scale the C-factor provided by the C-factor lookup module 216 based on one or more inputs, including, but not limited to, vehicle lateral acceleration, vehicle speed, etc. as described below in more detail. The rack position reference calculator 220 is configured to generate the rack position reference based on a scaled C-factor provided by the C-factor scaling module 230. As used herein, relative to the scaled C-factor, the C-factor provided by the C-factor lookup module may be referred to as a "baseline" C-factor.

For example, as described above, the baseline C-factor may be higher/greater for lower vehicle speeds and lower for higher vehicle speeds. However, even at the lower vehicle speeds, increased lateral acceleration may increase the likelihood of reaching tire adhesion limits. Accordingly, the C-factor scaling module 230 is configured to scale the baseline C-factor downward as lateral acceleration increase. In some examples, the rate at which the C-factor is scaled downward may vary based on vehicle speed and/or a lateral acceleration at which the C-factor begins to be scaled downward may vary based on vehicle speed. The C-factor may be scaled downward in a linear or non-linear manner.

As one example, the C-factor is scaled downward in accordance with one or more scaling factors. For example, for a given vehicle speed, the scaling factor may be set to a fixed value, such as one (1), in response to lateral acceleration being below a respective threshold. Upon reaching the threshold, the scaling factor may decrease (i.e., downward from one) as lateral acceleration increases. Further, for a given speed, more than one thresholds with corresponding downward scaling rates may be used. Accordingly, as lateral acceleration increases, the scaled C-factor decreases (e.g., by multiplying the scaling factor by the baseline C-factor).

As one example, the scaling factor may decrease to a minimum value (e.g., a non-zero value). The minimum value may be different for different vehicle speeds/ranges. The minimum value may be selected to be not less than a value at which a corresponding final steering ratio would no longer impact vehicle handling. For example, the minimum value may correspond to a minimum percentage of the baseline C-factor, such as 50% of the baseline C-factor (i.e., a scaling factor of 0.5), 33% of the baseline C-factor (i.e., a scaling factor of 0.33), etc.

In some examples, the dynamic C-factor control described herein may be implemented for different steering/performance modes of the vehicle. For example, for different steering modes, calibration of the C-factor scaling (e.g., scaling rates, thresholds, etc.) may be different. As one example, C-factor scaling for a comfort mode may be calibrated with a more aggressive scaling rate (e.g., a sharper decrease in scaling rate) relative to other modes. Conversely, C-factor scaling for performance or other active driving modes may be calibrated with a less aggressive scaling rate (e.g., a more gradual decrease in scaling rate).

Figure 2B:
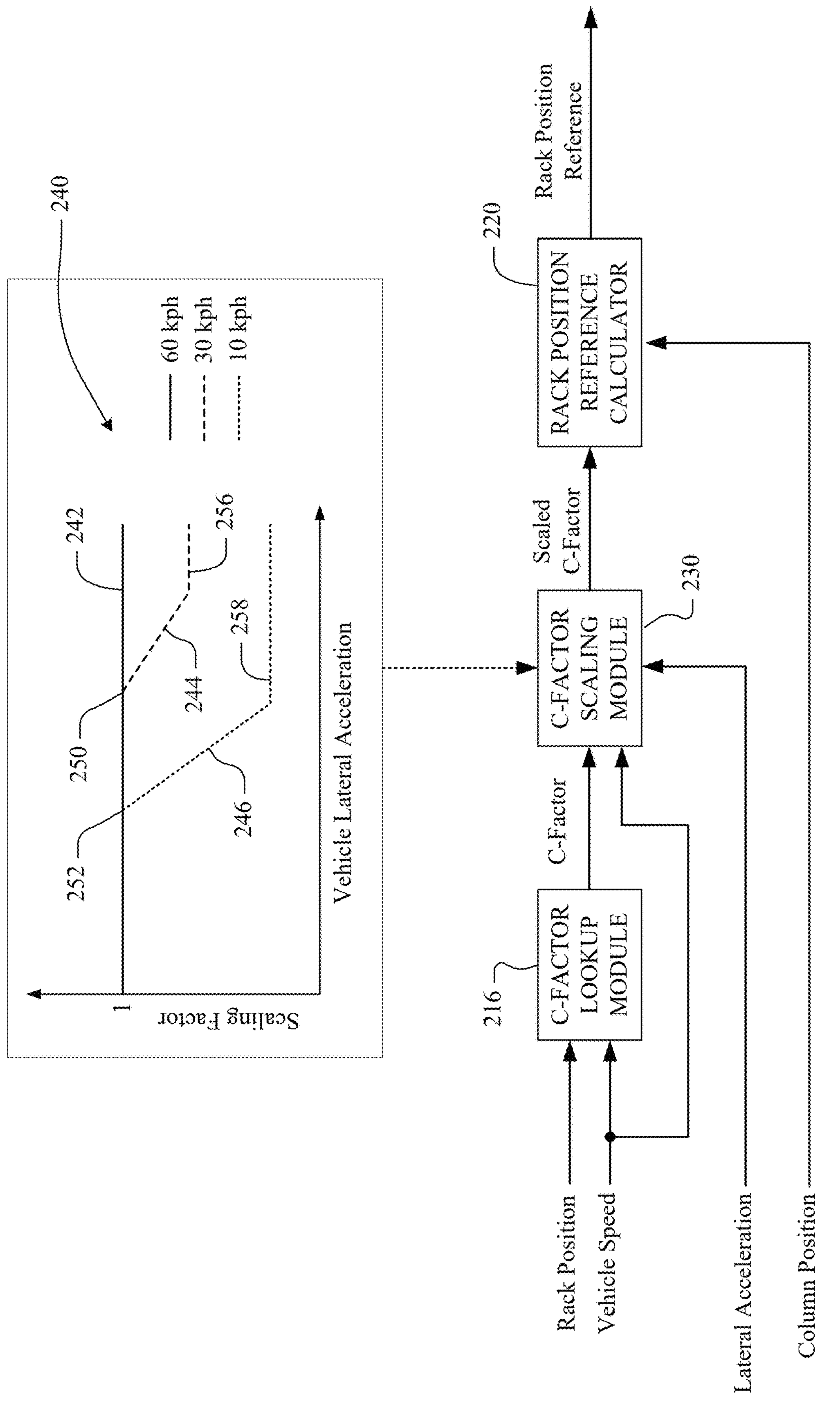
FIG. 2B generally illustrates an example implementation of dynamic C-factor control according to the principles of the present disclosure.

FIG. 2B shows an example implementation of dynamic C-factor control according to the principles of the present disclosure, including the C-factor lookup module 216, the C-factor scaling module 230, and the rack position reference calculator 220.

The C-factor lookup module 216 receives inputs including, but not limited to, a rack position and vehicle speed and determines the C-factor (e.g., a baseline C-factor) based on the rack position and vehicle speed. As described above, the C-factor may be obtained from a lookup table that correlates vehicle speed to respective C-factors. As one example, different vehicle speed ranges are indexed to respective C-factors. The different speed ranges may correspond to regular, uniform ranges (e.g., 0-5 kph, 5-10 kph, 10-15 kph, etc.), irregular, non-uniform ranges (e.g., 0-5 kph, 5-15 kph, 15-30 kph), and/or combinations thereof. Generally, the baseline C-factors may decrease as vehicle speed increases.

The C-factor scaling module 230 receives the C-factor (e.g., the baseline C-factor) from the C-factor lookup module 216. The C-factor scaling module 230 is configured to selectively scale the C-factor provided by the C-factor lookup module 216 (e.g., scale the C-factor downward) based on inputs including, but not limited to, vehicle lateral acceleration and vehicle speed. An example scaling factor control technique implemented by the C-factor scaling module 230 is shown at 240. As shown, a plurality of scaling factors 242, 244, and 246 correspond to different example vehicle speeds or speed ranges, such as 60 kph, 30 kph, and 10 kph, respectively. Although shown for the specific vehicle speeds (e.g., 60, 30, and 10 kph), the scaling factors may be obtained for various speeds using linear interpolation. For example, a scaling factor for a speed of 50 kph may be obtained by applying linear interpolation for the range between 30 kph and 60 kph (e.g. a scaling factor value between the respective scaling factors for 30 kph and 60 kph). As another example, the scaling factors may correspond to different vehicle speed ranges and the example vehicle speeds are located within respective ranges. For example, the vehicle speed of 60 kph may correspond to a range of 50-70 kph, the vehicle speed of 30 kph may correspond to a range of 25-35 kph, and the vehicle speed of 10 kph may correspond to a range of 0-10 kph.

In an example, the C-factor scaling module 230 is configured to select or determine a particular scaling factor based on vehicle speed (e.g., using a lookup table, a formula, etc.). For example, the C-factor scaling module 230 selects the scaling factor 242 in response to determining that the vehicle speed is 60 kph (or, within a vehicle speed range corresponding to the scaling factor 242, such as 50-70 kph), selects the scaling factor 244 in response to determining that the vehicle speed is 30 kph (or, within a vehicle speed range corresponding to the scaling factor 244, such as 25-35 kph), selects the scaling factor 246 in response to determining that the vehicle speed is 10 kph (or, within a vehicle speed range corresponding to the scaling factor 246, such as 0-10 kph), etc. The scaling factor for a vehicle speed in a given range may be obtained using linear interpolation as described above.

In this example, the scaling factor 242 may be constant (e.g., 1) and not decrease as vehicle lateral acceleration increases. For example, the baseline C-factor for higher speeds (e.g., 50 kph and above) may be sufficiently low such that decreasing the C-factor as vehicle lateral acceleration increases is not necessary or desirable. Accordingly, for some vehicle speeds, the C-factor is not scaled downward.

Conversely, the scaling factors 244 and 246 decrease as the vehicle lateral acceleration increases. As shown, the scaling factors 244 and 246 decrease at different rates and in response to the vehicle lateral acceleration reaching different thresholds. For example, the scaling factor 244 begins to decrease at a first rate in response to the vehicle lateral acceleration reaching a first threshold as shown at 250. The scaling factor 246 begins to decrease at a second rate in response to the vehicle lateral acceleration reaching a second threshold as shown at 252. In this example, the second rate is greater (i.e., more aggressive) than the first rate. Although being responsive to only one threshold, each of the scaling factors may be responsive to multiple thresholds and decrease at different rates in response to reaching different thresholds. For example, a given scaling factor may decrease at a first rate upon reaching one threshold and, as vehicle lateral acceleration increases, decrease at a second rate upon reaching another threshold. In other words, the scaling factors may decrease at different rates in a piecewise manner.

The scaling factors may have an associated minimum value. In other words, the scaling factors may be not decrease below the associated minimum value. Different minimum values may be assigned to respective scaling factors. For example, as shown, the scaling factor 244 may be assigned a first minimum value 256 while the scaling factor 246 may be assigned a second minimum value 258 less than the first minimum value. Further, as shown, the corresponding vehicle lateral acceleration at which the respective minimum values are reached may be different for different scaling factors.

C-factor scaling module 230 applies the selected/determined scaling factor to the baseline C-factor received from the C-factor lookup module 216. For example, the C-factor scaling module 230 determines a specific value of the scaling factor to apply to the baseline C-factor (e.g., by selecting the scaling factor based on vehicle speed and determining the value to apply based on the vehicle lateral acceleration, such us by using a formula, lookup table, etc.) and multiples the determined value by the baseline C-factor. In this manner, the C-factor scaling module 230 determines the scaled C-factor based on the baseline C-factor, vehicle speed, and vehicle lateral acceleration.

The rack position reference calculator 220 is configured to generate the rack position reference based on the scaled C-factor and one or more other inputs, such as column or handwheel position as described above.

Figure 3:
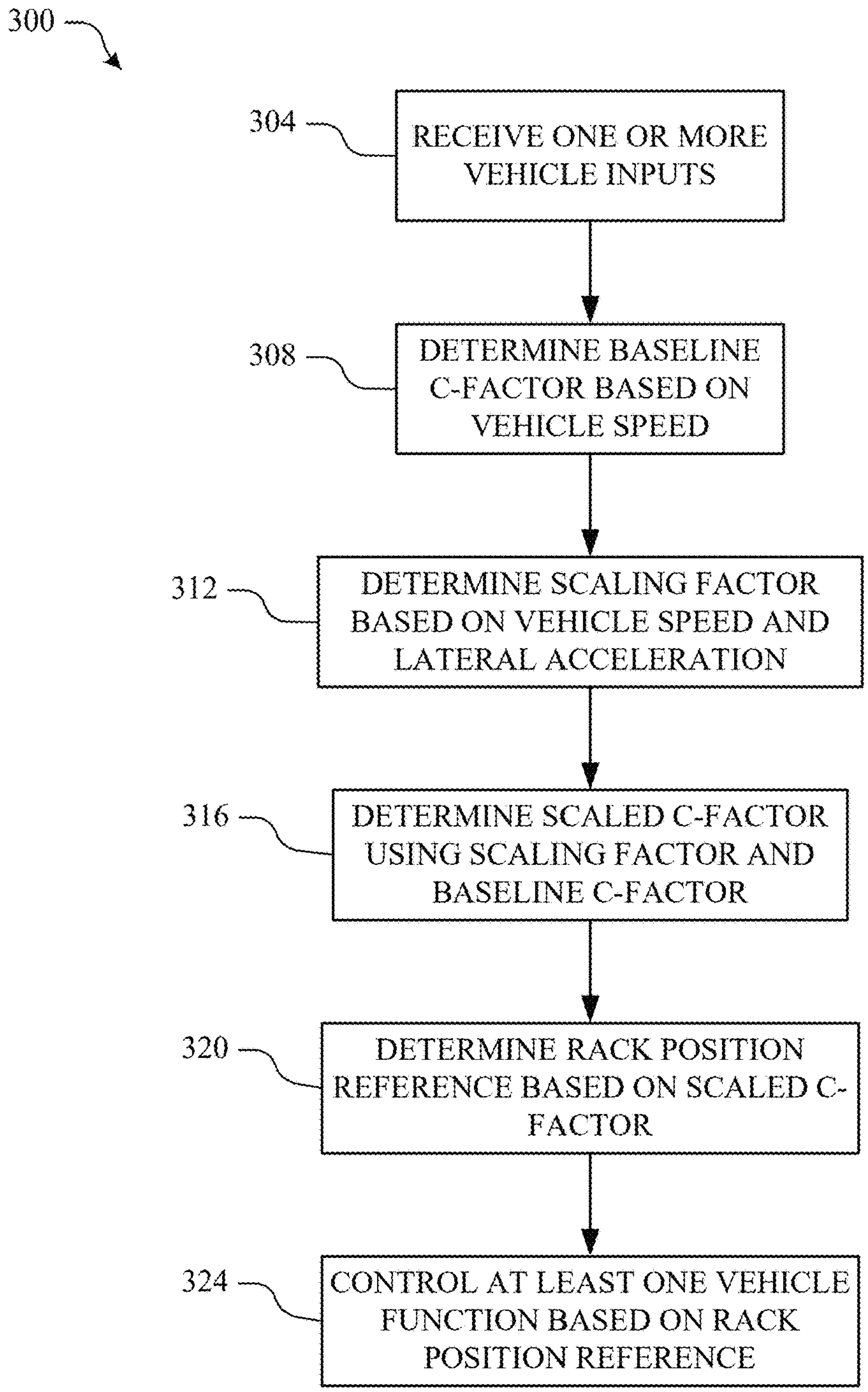
FIG. 3 is a flow diagram generally illustrating a method for controlling an SbW steering system according to the principles of the present disclosure.

FIG. 3 is a flow diagram generally illustrating a method 300 for controlling a SbW steering system (e.g., for generating a rack position reference or reference signal for a SbW steering system) according to the principles of the present disclosure. For example, one or more computing devices, processors, or processing devices, etc. are configured to execute instructions to implement the method 300, such as one or more of the processors of the systems described herein (e.g., a computing device or processor of a vehicle configured to implement the controller 100, the HWA controller 204, etc.). One or more of the steps of the method 300 as described below may be skipped or omitted in some examples, and/or one or more of the steps may be performed in a different sequence than described.

At 304, the method 300 includes receiving one or more vehicle inputs (e.g., from respective sensors, models or calculations, etc.) indicative of operating characteristics of a vehicle. In this example, the vehicle inputs may include, but are not limited to, rack position, vehicle speed, vehicle lateral acceleration, and/or column position.

At 308, the method 300 includes determining a baseline C-factor (e.g., based on at least vehicle speed). As one example, the baseline C-factor is obtained from a lookup table. At 312, the method 300 includes determining a scaling factor. For example, the scaling factor is determined based on the vehicle speed and vehicle lateral acceleration. At 316, the method 300 includes determining a scaled C-factor. For example, the scaled C-factor is determined by multiplying the scaling factor by the baseline C-factor.

At 320, the method 300 includes determining a rack position reference using the scaled C-factor. For example, the rack position reference may be determined by applying the scaled C-factor to one or more other vehicle inputs, such as a handwheel or column position.

At 324, the method 300 includes controlling at least one vehicle function based on the rack position reference. For example, controlling the at least one vehicle function may include, but is not limited to, one or more of: controlling lateral movement/steering of the vehicle by controlling a rack position based on the rack position reference and an actual rack position.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling a steer-by-wire (SbW) steering system of a vehicle, the method comprising, using one or more processors:

receiving one or more inputs indicating respective operating characteristics of the vehicle;

determining a baseline C-factor based on vehicle speed, wherein the baseline C-factor defines a relationship between a linear distance traversed by a rack of the SbW steering system relative and rotation of a handwheel of the vehicle;

determining a scaling factor based on the vehicle speed and vehicle lateral acceleration;

determining a scaled C-factor using the baseline C-factor and the scaling factor;

determining a rack position reference based on the scaled C-factor; and controlling at least one function of the vehicle using the rack position reference.

2. The method of claim 1, wherein controlling the at least one function of the vehicle includes controlling steering of the vehicle.

3. The method of claim 1, wherein determining the baseline C-factor includes selecting the baseline C-factor from among a plurality of C-factors indexed by vehicle speed.

4. The method of claim 1, wherein determining the scaling factor includes selecting the scaling factor from among a plurality of scaling factors, and wherein each of the plurality of scaling factors is associated with a different vehicle speed.

5. The method of claim 4, wherein two or more of the plurality of scaling factors decrease at different rates relative to one another.

6. The method of claim 4, wherein a first scaling factor of the plurality of scaling factors is associated with a first vehicle speed and decreases at a first rate, and wherein a second scaling factor of the plurality of scaling factors is associated with a second vehicle speed less than the first vehicle speed and decreases at a second rate greater than the first rate.

7. The method of claim 4, wherein a first scaling factor of the plurality of scaling factors has a first minimum value, and wherein a second scaling factor of the plurality of scaling factors has a second minimum value that is less than the first minimum value.

8. The method of claim 1, wherein the scaling factor decreases as the vehicle lateral acceleration increases.

9. A system for controlling a steer-by-wire (SbW) steering system of a vehicle, the system comprising:
- one or more sensors configured to determine one or more operating characteristics of a vehicle; and
- a processor configured to execute instructions stored in memory, wherein executing the instructions causes the processor to receive one or more inputs indicating respective operating characteristics of the vehicle,
- determine a baseline C-factor based on vehicle speed, wherein the baseline C-factor defines a relationship between a linear distance traversed by a rack of the SbW steering system relative and rotation of a handwheel of the vehicle,
- determine a scaling factor based on the vehicle speed and vehicle lateral acceleration,
- determine a scaled C-factor using the baseline C-factor and the scaling factor,
- determine a rack position reference based on the scaled C-factor, and
- control at least one function of the vehicle using the rack position reference.

10. The system of claim 9, wherein controlling the at least one function of the vehicle includes controlling steering of the vehicle.

11. The system of claim 9, wherein determining the baseline C-factor includes selecting the baseline C-factor from among a plurality of C-factors indexed by vehicle speed.

12. The system of claim 9, wherein determining the scaling factor includes selecting the scaling factor from among a plurality of scaling factors, and wherein each of the plurality of scaling factors is associated with a different vehicle speed.

13. The system of claim 12, wherein two or more of the plurality of scaling factors decrease at different rates relative to one another.

14. The system of claim 12, wherein a first scaling factor of the plurality of scaling factors is associated with a first vehicle speed and decreases at a first rate, and wherein a second scaling factor of the plurality of scaling factors is associated with a second vehicle speed less than the first vehicle speed and decreases at a second rate greater than the first rate.

15. The system of claim 12, wherein a first scaling factor of the plurality of scaling factors has a first minimum value, and wherein a second scaling factor of the plurality of scaling factors has a second minimum value that is less than the first minimum value.

16. The system of claim 9, wherein the scaling factor decreases as the vehicle lateral acceleration increases.

17. A system for controlling a steer-by-wire (SbW) steering system of a vehicle, the system comprising:
- a handwheel actuator (HWA) controller configured to
  - receive one or more inputs indicating respective operating characteristics of the vehicle,
  - determine a baseline C-factor based on vehicle speed, wherein the baseline C-factor defines a relationship between a linear distance traversed by a rack of the SbW steering system relative and rotation of a handwheel of the vehicle,
  - determine a scaling factor based on the vehicle speed and vehicle lateral acceleration,
  - determine a scaled C-factor using the baseline C-factor and the scaling factor, and
  - determine a rack position reference based on the scaled C-factor; and
- a roadwheel actuator (RWA) controller configured to control steering of the vehicle based the rack position reference.

18. The system of claim 17, wherein determining the baseline C-factor includes selecting the baseline C-factor from among a plurality of C-factors indexed by vehicle speed, wherein determining the scaling factor includes selecting the scaling factor from among a plurality of scaling factors, and wherein each of the plurality of scaling factors is associated with a different vehicle speed.

19. The system of claim 18, wherein at least one of:
- a first scaling factor of the plurality of scaling factors is associated with a first vehicle speed and decreases at a first rate, and a second scaling factor of the plurality of scaling factors is associated with a second vehicle speed less than the first vehicle speed and decreases at a second rate greater than the first rate; and
- the first scaling factor of the plurality of scaling factors has a first minimum value, and the second scaling factor of the plurality of scaling factors has a second minimum value that is less than the first minimum value.

20. The system of claim 17, wherein the scaling factor decreases as the vehicle lateral acceleration increases.

* * * * *